United States Patent [19]

Viscio et al.

[11] Patent Number: 5,411,357
[45] Date of Patent: May 2, 1995

[54] SCREW THREAD LOCKING INSERT

[75] Inventors: Donald P. Viscio, Danbury; Robert A. Gentile, New Milford, both of Conn.; Peter E. Kraus, Sarasota, Fla.

[73] Assignee: Emhart Inc., Newark, Del.

[21] Appl. No.: 160,617

[22] Filed: Dec. 2, 1993

[51] Int. Cl.⁶ .......................... F16B 37/12; F16B 39/28
[52] U.S. Cl. ................................. 411/110; 411/178; 411/322; 411/948
[58] Field of Search .............. 411/110, 140, 178, 322, 411/948; 29/456, 525.1

[56] References Cited

U.S. PATENT DOCUMENTS

| | | |
|---|---|---|
| 122,761 | 1/1872 | Dooley . |
| 573,044 | 12/1896 | Seely . |
| 2,367,399 | 1/1945 | Isakson ............... 411/948 X |
| 2,783,811 | 3/1957 | Cummaro . |
| 2,855,970 | 10/1958 | Neuschotz . |
| 3,105,535 | 10/1963 | Czarnowski . |
| 3,212,796 | 10/1965 | Neuschotz . |
| 3,319,688 | 5/1967 | Rosan et al. ............ 411/110 |
| 3,404,717 | 10/1968 | Rosan et al. ............ 411/110 |
| 3,415,301 | 12/1968 | Neuschotz . |
| 3,421,564 | 1/1969 | Neuschotz ............. 411/110 |
| 3,472,302 | 10/1969 | Rosan, Sr. et al. ...... 411/110 |
| 3,593,560 | 7/1971 | Neuschotz . |
| 3,604,105 | 9/1971 | Heyworth . |
| 3,650,309 | 3/1972 | Neuschotz . |
| 3,667,526 | 6/1972 | Neuschotz ............. 411/110 |
| 4,895,485 | 1/1990 | Guevara et al. ........ 411/110 X |

*Primary Examiner*—Neill R. Wilson
*Attorney, Agent, or Firm*—E. D. Murphy

[57] ABSTRACT

A device for locking a threaded insert into a prepared hole in a parent material. The device includes a locating portion, a locking portion and a gripping portion which is removed upon installation. The locating portion comprises a finger which is positioned in a preformed slot in the external threads of the threaded insert. The locking portion, which extends outwardly from the locating portion, is driven across the corresponding threads of the parent material to shear and distort the threads and lock the insert in place. The gripping portion which extends outwardly from the locking portion is used by the installer to position the device during installation and is then broken off.

6 Claims, 1 Drawing Sheet

SCREW THREAD LOCKING INSERT

FIELD OF THE INVENTION

This invention relates to a device for locking a threaded insert into a prepared hole in a parent material.

BACKGROUND OF THE INVENTION

Internally screw threaded inserts for repairing damaged threads in holes such as spark plug sockets and for providing threads of relatively harder material in a socket of a softer parent body are widely known. Prior art devices for locking such inserts in place are subject to various disadvantages. For example, known devices are frequently of slender, and thus breakable, construction; they may also be of complex configuration thus being relatively expensive to manufacture and to use. Some known devices, when finally seated, occupy space which would otherwise be filled by the material of the insert itself. The absence of this insert material weakens the insert or its strength of connection to the parent material, thus requiring the use of a larger insert than would otherwise be necessary to achieve a desired level of strength in the final product.

Other devices of this type have utilized keys premounted on the insert, but these are also subject to breakage or to inadvertent displacement of the key prior to installation.

Still further prior art devices have utilized single keys inserted in preformed slots but this class of device is also subject to several difficulties. Many such keys are subject to inadvertent reverse installation which may destroy the insert or, at best, make the incorrectly installed lock inoperative. Many prior art patents suggest overcoming this difficulty by providing a dovetail slot configuration, but this is a difficult and expensive machining process.

Finally, still other devices are subject to difficulties of accurately inserting the key and providing adequate locking force, particularly in the case of relatively short inserts in which the maximum permissible key length may simply be inadequate to accomplish all of the required functions.

OBJECTS AND ADVANTAGES OF THE INVENTION

It is a principle object of this invention to provide a locking device for screw thread inserts which is of simplified construction while still providing improved functionality.

It is a specific object of this invention to provide a single locking pin for screw thread inserts which is sturdy in construction, simple in use and which provides an improved locking connection.

It is a further object of this invention to provide a locking device for screw thread inserts which provides for accurate insertion and secure locking strength even in short insert structures while at the same time being extremely simple to install.

BRIEF DESCRIPTION OF THE DRAWINGS

This invention will now be described with reference to the accompanying drawings in which.

DESCRIPTION OF THE PREFERRED EMBODIMENT

Figure 1:
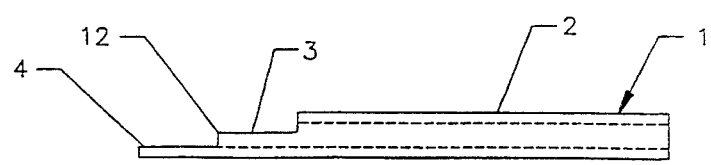
FIG. 1 is a side plan view of a locking pin in accordance with the present invention.
Figure 2:
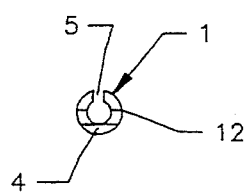
FIG. 2 is an end view of the locking pin shown in FIG. 1.

As shown in FIGS. 1 and 2, the locking pin 1 of this invention comprises a generally tubular member having a first break-away portion 2, a second cutting portion 3, and a locating finger 4. The pin 1 may be formed as a continuous tube with portions cut away to form portions 3 and 4 or may be formed as a roll pin as indicated by the gap 5 in FIG. 2. Alternatively, in some applications, the pin 1 may comprise a solid cylinder with parts removed to form the finger and the cutting portion.

As shown in FIGS. 3–6 the threaded insert with which the pin 1 is to be used is normally of the conventional type comprising a cylindrical sleeve 6 with internal threads 7 and external threads 8. Of course, the pin of this invention may also be used with other insert configurations.

Figure 6:
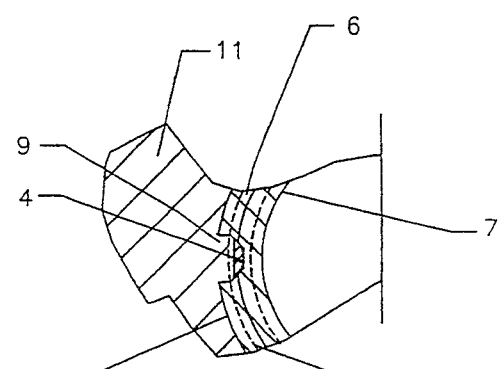
FIG. 6 is a partial cross-sectional view taken on the lines VI—VI of FIG. 3.
Figure 3:
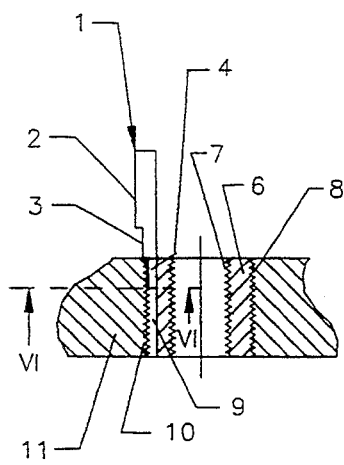
FIGS. 3, 4 and 5 are cross-sectional views showing details of the installation of the locking pin of FIG. 1.
Figure 4:
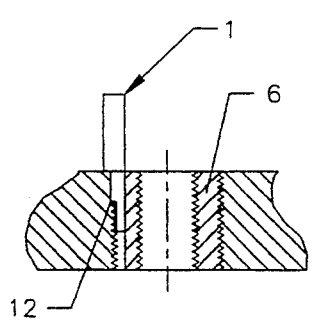
Figure 5:
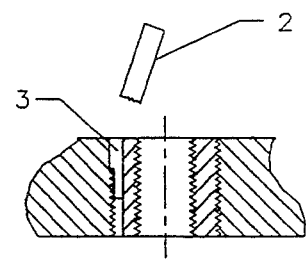

As shown in FIGS. 3 and 6, the insert 6 includes at least one axial cutaway slot 9 in its external threads 8. The cutaway slot 9 provides an aperture sized to receive the locating finger 4 of pin 1 when it is first put in place as shown in FIG. 3 and after the pin has been fully driven home as shown in FIGS. 4 and 5.

As previously noted, a particular problem with prior art devices of this type has been the possibility that the device may be inserted at an incorrect orientation and thus fail to function. In accord with this invention, this problem is overcome by providing a concave outward shape at the base of the slot 9 which approximately corresponds to the convex outer shape of the locating finger 4 when the pin 1 is properly oriented. Since the internal surfaces at the base of the slot 9 would interfere with the width of the finger 4 if the pin is reversed, the incorrect orientation of the pin is simply and easily precluded.

In the normal usage of insert 6, some form of tapping stroke will have created internal threads 10 in the body of parent material 11. As previously noted, these may comprise refurbished or re-created threads in a previously damaged socket or they may comprise newly manufactured threads in a body of relatively softer material such as, for example, brass in which a harder insert such as steel is to be installed during a manufacturing process.

In accord with this invention, the cutaway slot 9 is provided only in the external threads of the insert 6. The internal threads 10 in body 11 are normal, continuous screw threads extending from the top of the aperture in body 11 as far into the body as may be necessary.

In the use of the locking pin 1 of FIG. 1, the locating portion 4 of pin 1 is inserted into the slot 9 in insert 6, as shown in FIG. 3. The locking pin is installed so that the extension of portions 3 and 2 relative to finger 4 face radially away from the center axis of the insert 6. The depth of the slot is also limited so that the distance between the threads 10 and the bottom of the slot combined with the previously mentioned shape of the slot bottom prevents insertion of the pin 1 except at the correct orientation.

The locking pin 1 is then driven, normally by a hammer blow, so that the cutting portion 3 of pin 1 cuts through the first several threads of the parent material as the cutting portion 3 is forced downwardly alongside the insert 6. As shown in the drawings, the axially forward face of cutting portion of cutting surface 3 adjacent finger 4 is a flat surface with a sharp edge 12 to facilitate a punch-type deformation of the threads 10 as the pin is driven into the body.

In particular accord with one feature of this invention, the portion 2 of pin 1 is elongated to facilitate the simple installation thereof since the additional length of portion 2 enables an operator to hold the pin steady with his fingers while striking the hammer blow which drives portion 3 into the threads of the parent material. This feature of particular utility in installations where the depth of the insert is relatively shallow. In such cases, it has previously been difficult to provide an adequate locking key without resorting to the disadvantageous methods of the prior art. The elongated portion 2 of this invention allows an operator to control the pin as it is being installed, thus permitting the finger 4 to be relatively short and maximizing the length of the cutting portion 3 to provide maximum locking force.

Finally, the tubular portion 2 is broken off by a hammer blow preferably directed toward the axis of the insert, leaving a flush fully installed locking pin made up of the remaining portion 3 and finger 4. At this point, the part of the thread material of 10 which has been displaced by the portion 3 is deformed and lies in tight frictional engagement with the pin 1 and threads 8, thus providing a very secure locking force.

In accord with this invention, accordingly, portions of the thread of the parent material are forcibly driven out of the way of the cutting portion 3 of pin 1, and thus are forced into tight engagement with the installed portions of the locking pin as well as with the edges of the thread 8 of insert 6. This forcible deformation of the parent material provides a very secure and permanent locking engagement of the insert 6 to the parent material 11.

It can thus be seen that the present invention presents a simplified and improved locking pin which is sturdy and simple in construction as well as being easy to use while providing an improved locking force. At the same time, the device of this invention is not subject to the disadvantages of the prior art as identified above.

We claim:

1. A locking pin for use in locking an insert to an aperture in a parent body comprising a first, break-away portion, said portion being sufficiently elongated to enable it to be held in a given location by human fingers;

a second cutting portion extending from said break-away portion, said cutting portion terminating in a flat surface having sharp edges to facilitate entry into a parent body by punching into the parent material; and a locating finger extending from said flat surface to extend into an aperture in the insert adjacent the parent body.

2. A locking pin as claimed in claim 1 wherein said break-away portion comprises a hollow tube and wherein said cutting portion comprises a generally C-shaped continuation of part of said tube.

3. A locking pin as claimed in claim 1 wherein said locating finger is D-shaped in cross-section, the flat side of said D-shape being positioned to face toward said flat surface of said cutting portion.

4. A method of locking an externally threaded insert into an internally threaded parent body comprising the steps of:

providing an internally threaded aperture in a parent body;

providing an externally threaded insert sized to fit said aperture;

providing an axially extending slot in said external threads of said insert;

mounting said insert in said aperture;

providing a locking pin having a locating finger, a cutting portion and a break-away portion;

placing said finger in said slot, said cutting portion being disposed adjacent said internal threads of said parent body;

driving said pin further into said slot to force a portion of said internal threads into tight frictional engagement with said insert and said pin; and breaking off said break-away portion of said pin.

5. A method as claimed in claim 1 and including the further step of providing an elongated break-away portion of said pin to enable said pin to be hand-held in place prior to said driving step.

6. A method as claimed in claim 1 and including the further steps of:

forming said slot with a bottom surface which is concave; and forming said locating finger with a corresponding convex shape, the maximum width of said finger being sufficient to prevent insertion of said finger into said slot with said convex shape facing radially outwardly.

* * * * *